United States Patent
Nakamura et al.

(10) Patent No.: US 7,956,502 B2
(45) Date of Patent: Jun. 7, 2011

(54) WIPER APPARATUS AND MANUFACTURING METHOD THEREOF

(75) Inventors: Masatoshi Nakamura, Gunma (JP); Masahiro Nakazato, Tochigi (JP)

(73) Assignee: MITSUBA Corporation, Kiryu-shi (JP)

( * ) Notice: Subject to any disclaimer, the term of this patent is extended or adjusted under 35 U.S.C. 154(b) by 281 days.

(21) Appl. No.: 12/411,496

(22) Filed: Mar. 26, 2009

(65) Prior Publication Data
US 2009/0267433 A1 Oct. 29, 2009

(30) Foreign Application Priority Data
Mar. 27, 2008 (JP) .................................. 2008-082942

(51) Int. Cl.
*H02K 7/06* (2006.01)
(52) U.S. Cl. .............. 310/83; 310/71; 310/68 B; 310/91
(58) Field of Classification Search .................... 310/71, 310/68 B, 83, 89, 91, 98–99
See application file for complete search history.

(56) References Cited

U.S. PATENT DOCUMENTS

| | | | | |
|---|---|---|---|---|
| 5,068,500 | A * | 11/1991 | Kitada | 200/19.01 |
| 5,142,729 | A * | 9/1992 | Imamura | 15/250.16 |
| 6,545,380 | B1 * | 4/2003 | Saussele et al. | 310/75 R |
| 6,703,732 | B2 * | 3/2004 | Grass | 310/75 R |
| 7,135,801 | B2 * | 11/2006 | Yagi | 310/239 |
| 7,548,001 | B2 * | 6/2009 | Macaire | 310/71 |
| 7,605,506 | B2 * | 10/2009 | Kanda et al. | 310/71 |
| 2002/0121820 | A1 * | 9/2002 | Grass | 310/68 B |
| 2003/0025411 | A1 * | 2/2003 | Gotou | 310/91 |
| 2006/0043803 | A1 * | 3/2006 | Yagi | 310/68 B |
| 2007/0226939 | A1 * | 10/2007 | Takada | 15/250.31 |
| 2007/0278873 | A1 * | 12/2007 | Macaire | 310/71 |

FOREIGN PATENT DOCUMENTS

| | | |
|---|---|---|
| JP | 63197765 | 12/1988 |
| JP | 09301131 | 11/1997 |
| JP | 2007-181383 A | 7/2007 |

OTHER PUBLICATIONS

The Notification of Reason for Rejection issued from the Japanese Patent Office on Jul. 20, 2010 and translation thereof.

* cited by examiner

*Primary Examiner* — Thanh Lam
(74) *Attorney, Agent, or Firm* — McCormick, Paulding & Huber LLP

(57) ABSTRACT

The present invention enables replacement work of a wiper motor to be carried out with a link plate being fixed to an output shaft, and achieves improvement of maintainability. A diameter dimension of a through-hole of a motor bracket is set to that of allowing a tip side of a link plate with a ball joint to pass through the through-hole in a state where the link plate is inclined with respect to the motor bracket. Thus, the replacement work of the wiper motor can be carried out with the link plate being fixed to the output shaft. Alignment work of the link plate with respect to the output shaft becomes unnecessary at a time of the replacement work of the wiper motor, and maintainability can be significantly improved without decreasing positional accuracy of wiper members with respect to a front glass.

6 Claims, 10 Drawing Sheets

WIPER APPARATUS AND MANUFACTURING METHOD THEREOF

CROSS-REFERENCE TO RELATED APPLICATIONS

Applicant hereby claims foreign priority benefits under U.S.C. §119 from Japanese Patent Application No. 2008-082942 filed on Mar. 27, 2008, the contents of which are incorporated by reference herein.

TECHNICAL FIELD OF THE INVENTION

The present invention relates to a wiper apparatus, which has a wiper motor for swinging and driving a wiper member provided on a windshield and wipes deposits adhering to the windshield, and relates to a manufacturing method thereof.

BACKGROUND OF THE INVENTION

Conventionally, a vehicle such as an automobile has been equipped with a wiper apparatus for wiping a windshield. Such a wiper apparatus has a wiper motor for swinging and driving wiper members provided on the windshield, and the wiper motor is adapted to be rotationally driven by operating an operation switch in a vehicle compartment. Between the wiper motor and a pivot shaft to which the wiper member is coupled, there is provided a link mechanism for converting a rotational movement of the wiper motor into a swinging movement, whereby the wiper members are allowed to be swung and driven through the pivot shafts and to wipe deposits (rainwater, dirt, and the like) adhering to the windshield.

As such a wiper apparatus, for example, a technique disclosed in Japanese Patent Application Laid-Open Publication No. 2007-181383 (Patent Document 1) has been known. The wiper apparatus disclosed in Patent Document 1 is a so-called frame-integrated modular-type wiper apparatus, which includes a pair of pivot shafts corresponding to a driver's seat side and an assistant's seat side of the vehicle and a pair of pivot holders pivotably supporting the respective pivot shafts, wherein the respective pivot holders are coupled by a frame member.

A motor bracket is fixed to the frame member, and a wiper motor is mounted onto the motor bracket. The motor bracket is provided with a through-hole for communicating with one side surface and the other side surface thereof, and an output shaft of the wiper motor passes through the through-hole. A crank arm (link plate) having a width dimension larger than a diameter dimension of the through-hole is fixed to a tip side of the output shaft so as to be substantially perpendicular to an axis of the output shaft. In this manner, the wiper motor is mounted on one side surface of the motor bracket, and the crank arm is disposed on the other side surface of the motor bracket.

SUMMARY OF THE INVENTION

Meanwhile, the wiper motor has a rotational-position detecting member for detecting a rotational position of the output shaft, and positional accuracy of the wiper members is ensured by detecting the rotational position of the output shaft using the rotational-position detecting member. For this reason, each wiper member can be caused to be swung and driven between its upper reversing position and lower reversing position (in a wiping range) on the windshield with high accuracy, whereby it becomes possible to ensure sufficient visibility of the driver. Therefore, the crank arm to be fixed on the tip side of the output shaft needs to be fixed while being positioned at a prescribed position with respect to a rotational direction of the output shaft. If the crank arm is fixed at a deviation angle from the output shaft, positional accuracy of the wiper members may be decreased.

For example, when the wiper motor deteriorates (causes abnormal sound, increases operating resistance, or the like) due to long-term use of the wiper motor, there is required maintenance of the wiper apparatus such as replacement of the wiper motor with a new one. However, according to the wiper apparatus disclosed in Patent Document 1 described above, it is necessary to remove the crank arm from the output shaft when an old wiper motor is removed from the motor bracket, and also to mount a new wiper motor to the motor bracket, thereafter position the crank arm at a prescribed position with respect to the rotational direction of the output shaft, and fix the crank arm to the output shaft in a positioned state. Accordingly, labors, such as positioning of the crank arm at the output shaft during an operation of the wiper motor, have been required, and replacement work of the wiper motor has been complicated, whereby maintainability has been made low.

An object of the present invention is to provide a wiper apparatus, in which replacement work of a wiper motor can be carried out with a link plate being fixed to an output shaft, whereby improvement of maintainability can be achieved.

A wiper apparatus according to the present invention has a wiper motor which swings and drives a wiper member provided on a windshield, and wiping deposits on the windshield, the wiper apparatus comprising: a yoke, inside which magnets are fixed so as to be arranged oppositely to each other and which forms the wiper motor; an armature shaft rotatably provided between the magnets; a gear case connected to the yoke and forming the wiper motor; a speed-reduction mechanism rotatably provided in the gear case and reducing speed of rotation of the armature shaft; an output shaft, whose base end side is fixed to the speed-reduction mechanism and whose tip side extends outside the gear case; a rotational-position detecting member provided in the gear case and detecting a rotational position of the output shaft with respect to the gear case; a link plate, whose base end side is fixed on the tip side of the output shaft at a prescribed position with respect to a rotational direction of the output shaft; and a motor bracket provided between the wiper motor and the link plate, the wiper motor being mounted onto one side surface of the motor bracket, and the motor bracket having a through-hole through which the output shaft passes toward the other side surface of the motor bracket, wherein a diameter dimension of the through-hole is set to a diameter dimension of allowing a tip side of the link plate to pass through the through-hole in a state where the link plate is inclined with respect to the motor bracket.

The wiper apparatus according to the present invention is such that the diameter dimension of the through-hole is set to a diameter dimension of allowing the tip side of the link plate to pass through the through-hole in a state where a joint member is fixed to the tip side of the link plate.

The wiper apparatus according to the present invention is such that the rotational-position detecting member comprises: a first detecting member provided integrally with the speed-reduction mechanism and rotating with the output shaft; and a second detecting member provided to a non-rotating portion in the gear case opposed to the first detecting member, the second detecting member detecting a rotational state of the first detecting member.

A manufacturing method of a wiper apparatus according to the present invention, in which the wiper apparatus has a wiper motor swinging and driving a wiper member provided on a windshield and wipes deposits on the windshield, comprises: a first step of preparing a wiper motor including: a yoke, inside which magnets are fixed oppositely to each other; an armature shaft rotatably provided between the magnets; a gear case connected to the yoke; a speed-reduction mechanism rotatably provided in the gear case and reducing speed of rotation of the armature shaft; an output shaft, whose base end side is fixed to the speed-reduction mechanism and whose tip side extends outside the gear case; a rotational-position detecting member provided in the gear case, and detecting a rotational position of the output shaft with respect to the gear case; and a link plate, whose base end side is fixed on the tip side of the output shaft at a prescribed position with respect to a rotational direction of the output shaft; a second step of preparing a motor bracket having a through-hole through which the output shaft passes, inclining the link plate with respect to the motor bracket, and inserting a tip side of the link plate into the through-hole in an inclined state; and a third step of returning, to a horizontal position, the inclination of the link plate with respect to the through-hole, and fixing the wiper motor to the motor bracket by a fixing screw.

The manufacturing method of a wiper apparatus according to the present invention is such that a joint member is previously fixed to the tip side of the link plate in the first step, and the tip side of the link plate, to which the joint member is fixed, is inserted into the through-hole in the second step.

The manufacturing method of a wiper apparatus according to the present invention is such that the rotational-position detecting member comprises: a first detecting member provided integrally with the speed-reduction mechanism and rotating with the output shaft; and a second detecting member provided to a non-rotating portion in the gear case opposed to the first detecting member, the second detecting member detecting a rotational state of the first detecting member.

According to the wiper apparatus of the present invention, since the diameter dimension of the through-hole of the motor bracket is set to the diameter dimension of allowing the tip side of the link plate to pass through the through-hole in a state where the link plate is inclined with respect to the motor bracket, replacement work of the wiper motor can be carried out with the link plate being fixed to the output shaft. Accordingly, alignment work of the link plate with respect to the output shaft becomes unnecessary at a time of the replacement work of the wiper motor, and maintainability can be improved without decreasing positional accuracy of the wiper member with respect to the windshield. Moreover, since the replacement work of the wiper motor can be carried out while the link plate is inclined, a decrease in efficiency of the replacement work can be suppressed even if a space around the wiper motor is small.

According to the wiper apparatus of the present invention, since the diameter dimension of the through-hole is set to the diameter dimension of allowing the tip side of the link plate to pass through the through-hole in a state where the joint member is fixed to the tip side of the link plate, the replacement work of the wiper motor can be carried out with the joint member being fixed to the tip side of the link plate, and the maintainability can be further improved.

According to the wiper apparatus of the present invention, the rotational-position detecting member comprises: the first detecting member provided integrally with the speed-reduction mechanism and rotating with the output shaft; and the second detecting member provided to the non-rotating portion in the gear case opposed to the first detecting member, and detecting the rotational state of the first detecting member. Therefore, it is possible to detect the rotational state of the first detecting member by the second detecting member and detect the rotational position of the output shaft.

According to the manufacturing method of the wiper apparatus, which is the present invention, the wiper apparatus can be manufactured by: the first step of preparing the wiper motor having the link plate; the second step of inclining the link plate with respect to the through-hole of the motor bracket, and inserting the tip side of the link plate into the through-hole; and the third step of fixing the wiper motor to the motor bracket. Accordingly, work steps, such as removal of the link plate from the output shaft and fixture of the link plate to the output shaft, can be omitted at a time of the replacement work of the wiper motor, and the maintainability can be improved.

According to the manufacturing method of the wiper apparatus, which is the present invention, the joint member is previously fixed to the tip side of the link plate in the first step, and the tip side of the link plate, to which the joint member is fixed, is inserted into the through-hole in the second step, so that the replacement work of the wiper motor can be carried out with the joint member being fixed to the tip side of the link plate, and the maintainability can be further improved.

According to the manufacturing method of the wiper-apparatus, which is the present invention, the rotational-position detecting member comprises: the first detecting member provided integrally with the speed-reduction mechanism and rotating with the output shaft; and the second detecting member provided to the non-rotating portion in the gear case opposed to the first detecting member and detecting the rotational state of the first detecting member. Therefore, it is possible to detect the rotational state of the first detecting member by the second detecting member and detect the rotational position of the output shaft.

DESCRIPTION OF THE PREFERRED EMBODIMENTS

One embodiment of the present invention will be described in detail below with reference to the drawings.

Figure 1:
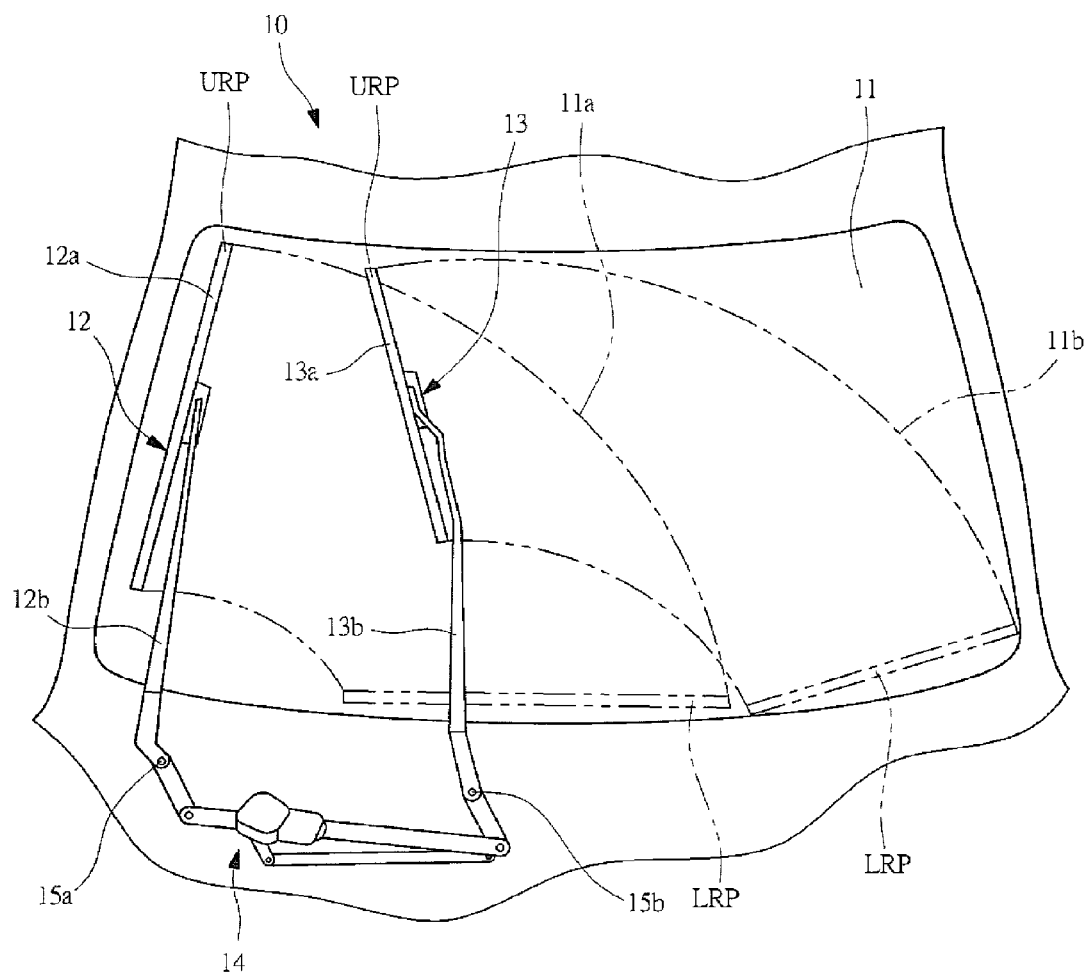
FIG. 1 is an explanatory diagram showing a front side of a vehicle equipped with a wiper apparatus according to the present invention.
Figure 2:
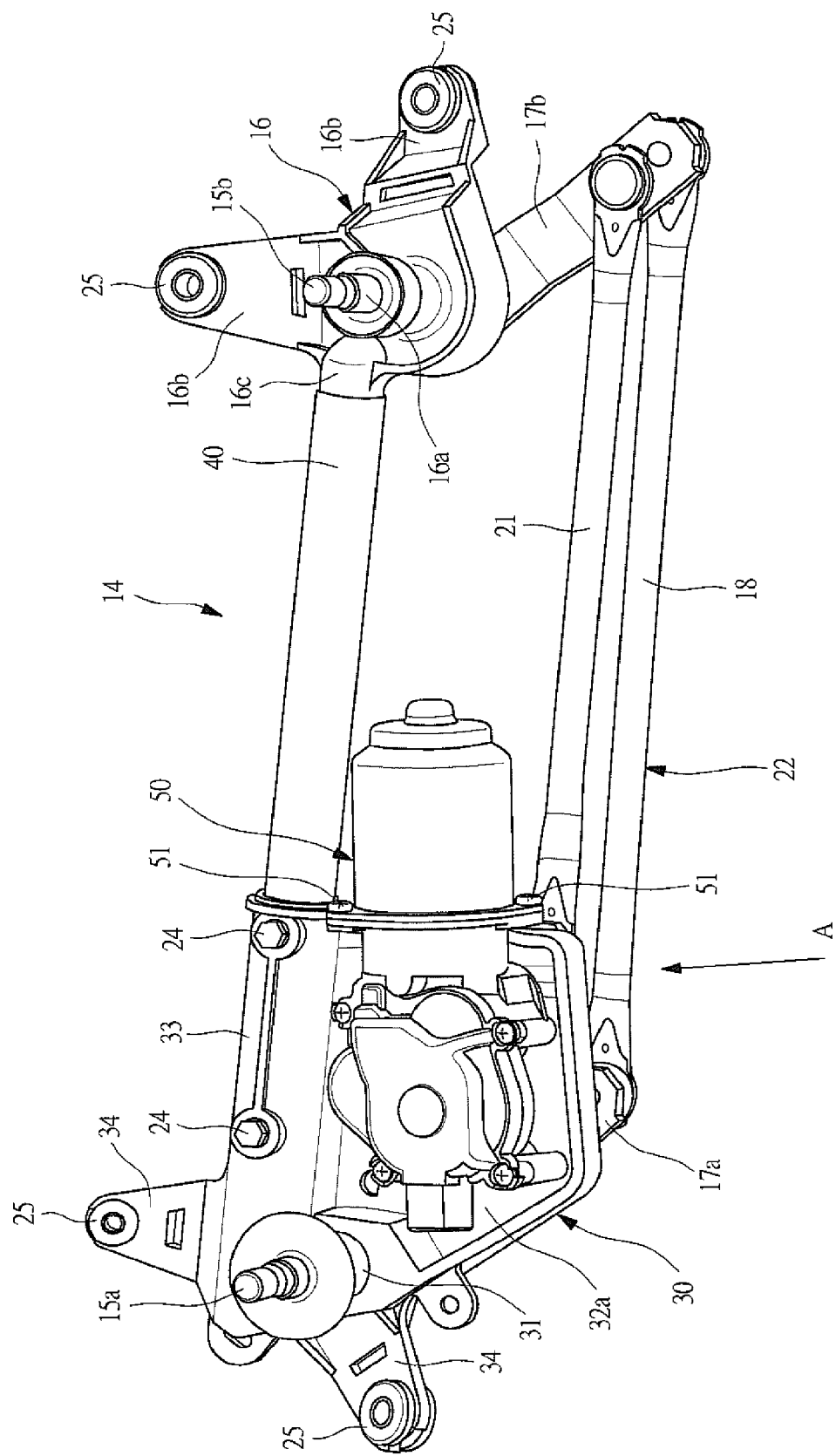
FIG. 2 is a perspective view showing the wiper apparatus of FIG. 1.
Figure 3:
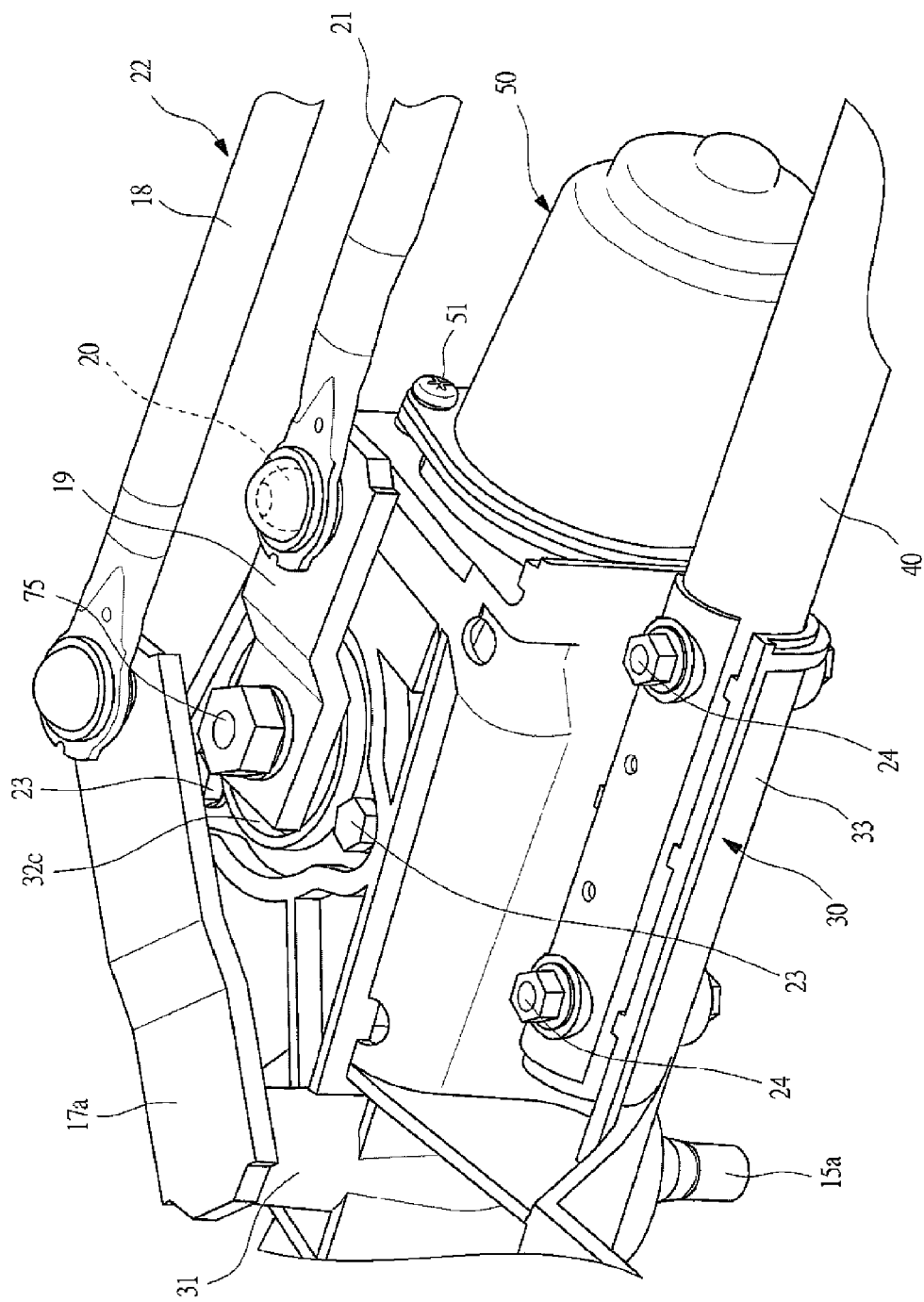
FIG. 3 is a perspective view in which a portion of a motor bracket is viewed from a backside.
Figure 4:
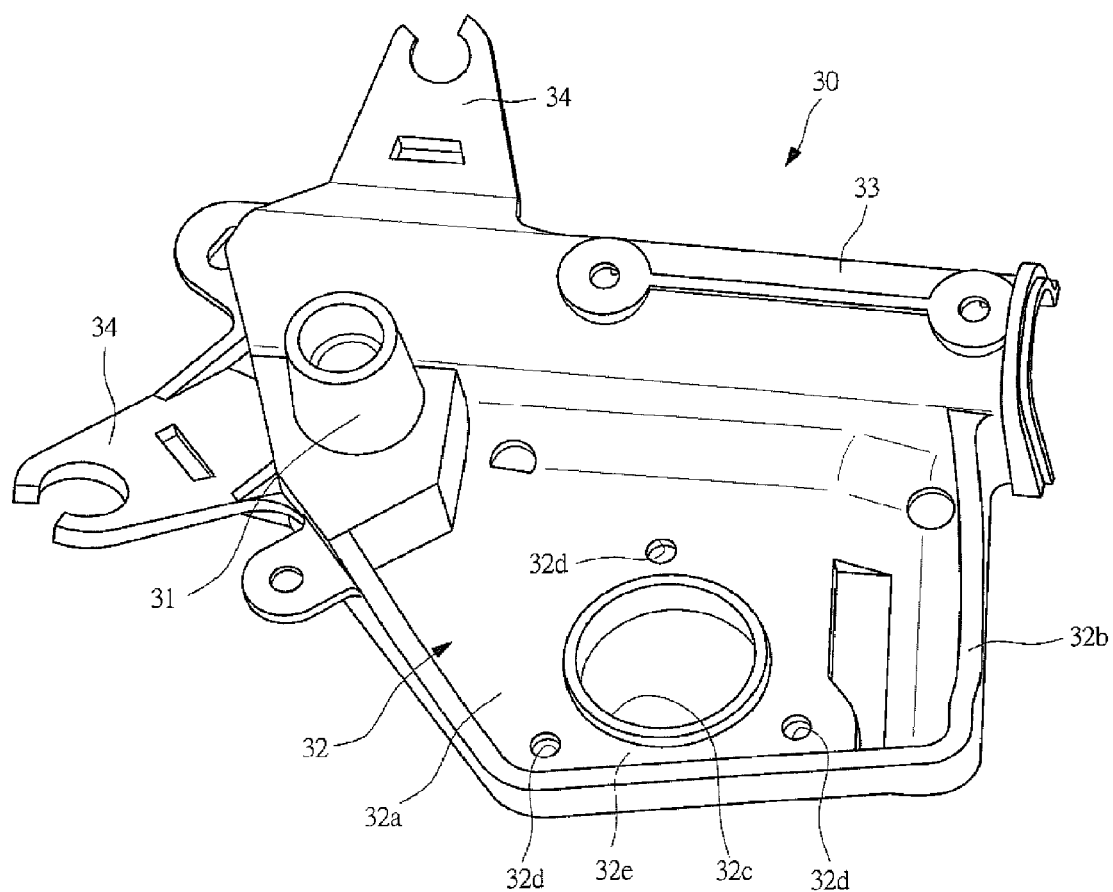
FIG. 4 is an explanatory diagram describing a structure of the motor bracket.
Figure 5:
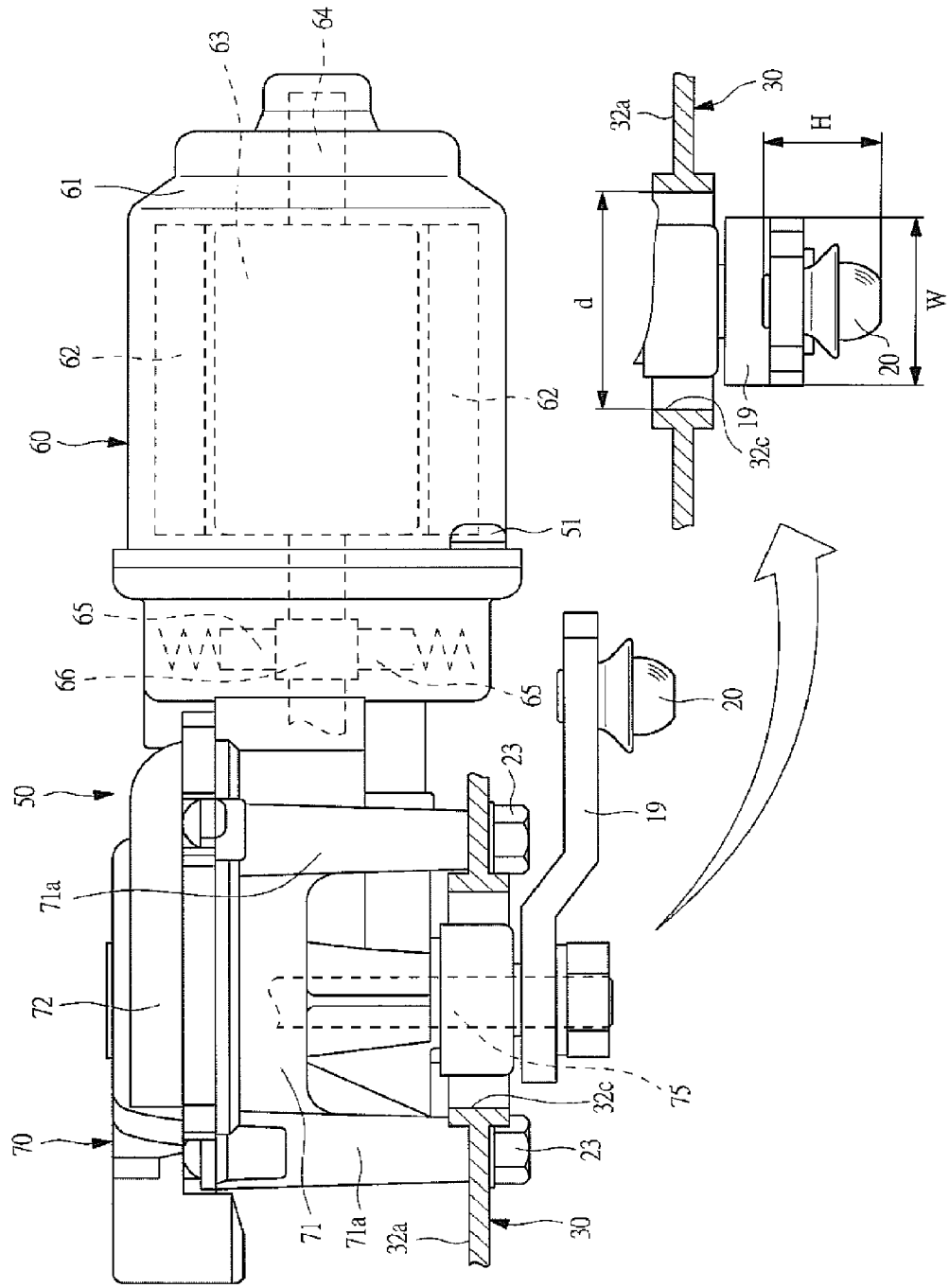
FIG. 5 is an enlarged view in which a wiper motor is viewed from a direction of arrow A of FIG. 2.
Figure 6:
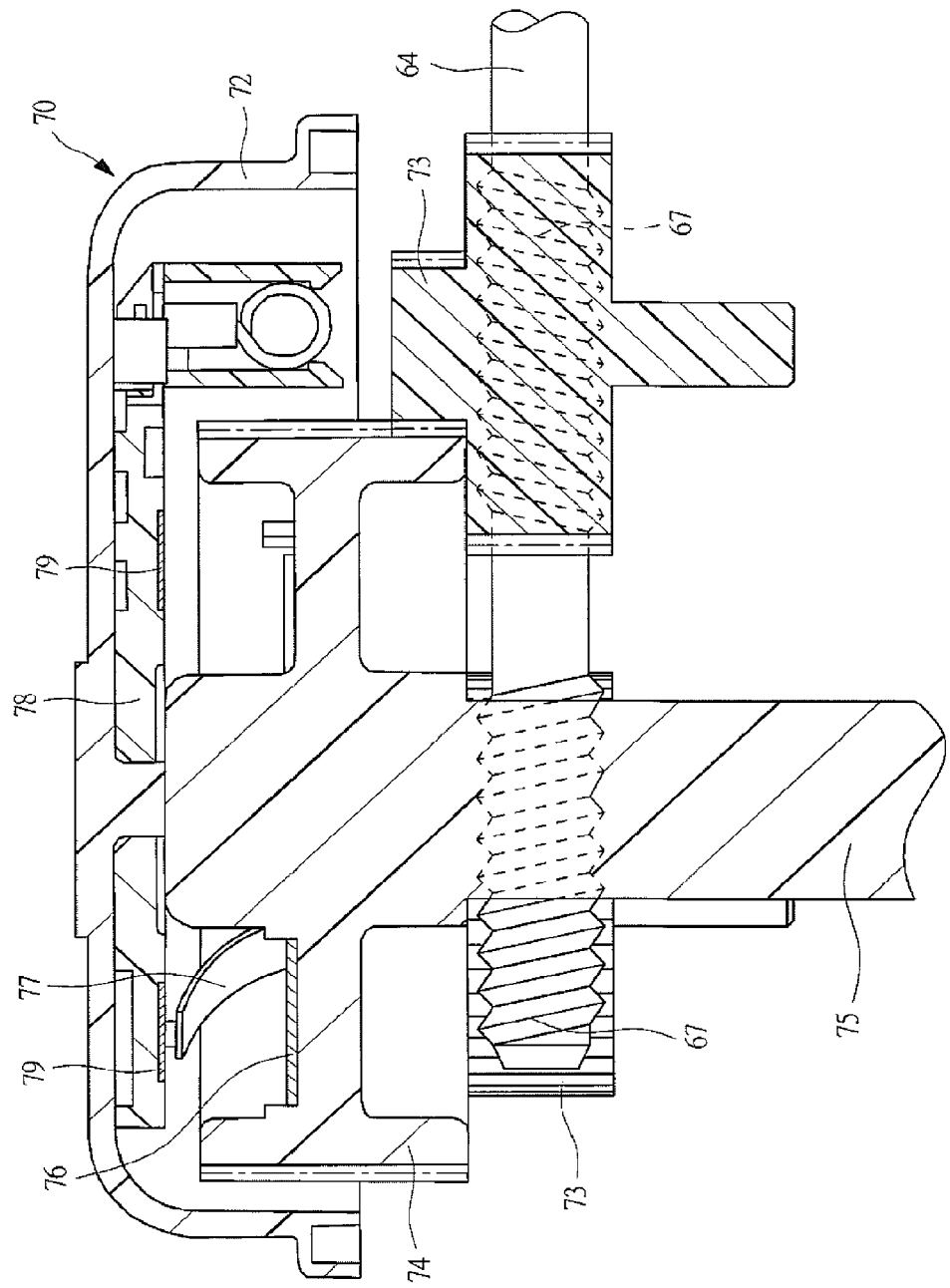
FIG. 6 is an explanatory diagram describing a cover and a speed-reduction mechanism.

FIG. 1 is an explanatory diagram showing a front side of a vehicle equipped with a wiper apparatus according to the present invention; FIG. 2 is a perspective view showing the wiper apparatus of FIG. 1; FIG. 3 is a perspective view in which a portion of a motor bracket is viewed from a back side; FIG. 4 is an explanatory diagram describing a structure of the motor bracket; FIG. 5 is an enlarged view in which a wiper motor is viewed from a direction of arrow A of FIG. 2; and FIG. 6 is an explanatory diagram describing a cover and a speed-reduction mechanism.

As shown in FIG. 1, a front glass 11 as a windshield is provided on a front side of a vehicle 10. The front glass 11 is provided with a DR-side (driver's seat side) wiper member 12 and an AS-side (assistant's seat side) wiper member 13 for wiping rain, dirt, and the like (deposits) adhering to the front glass 11.

The DR-side wiper member 12 has a DR-side wiper blade 12a and a DR-side wiper arm 12b, and the DR-side wiper blade 12a is pivotably mounted on a tip side of the DR-side wiper arm 12b. The AS-side wiper member 13 has an AS-side wiper blade 13a and an AS-side wiper arm 13b, and the AS-side wiper blade 13a is pivotably mounted on a tip side of the AS-side wiper arm 13b. The wiper blades 12a and 13a are adapted to come into elastic pressure contact with the front glass 11 due to coil springs (not shown) provided inside the wiper arms 12b and 13b, respectively.

The wiper blades 12a and 13a are adapted to make reciprocating wiping movements in the same directions in synchronization with each other within wiping ranges 11a and 11b formed between lower reversing positions LRP and upper reversing positions URP on the front glass 11, respectively. That is, each wiping pattern of the wiper blades 12a and 13a is of a tandem type.

A wiper apparatus 14 for wiping the front glass 11 is equipped on a front end side of the front glass 11 of the vehicle 10. As shown in FIGS. 2 and 3, the wiper apparatus 14 is a so-called frame-integrated modular-type wiper apparatus in which a motor bracket 30, on which a wiper motor 50 for swinging and driving the wiper members 12 and 13 is mounted, is fixed on a DR-side (left side in Figures) of a frame member 40.

The wiper apparatus 14 includes a DR-side pivot shaft 15a, to whose one end side the DR-side wiper arm 12b is fixed, and an AS-side pivot shaft 15b, to whose one end side the AS-side wiper arm 13b is fixed. The DR-side pivot shaft 15a is pivotably supported by the motor bracket 30, and the AS-side pivot shaft 15b is pivotably supported by a pivot holder 16.

One end side of a DR-side driving lever 17a is fixed to the other end side of the DR-side pivot shaft 15a, and one end side of an AS-side driving lever 17b is fixed to the other end side of the AS-side pivot shaft 15b. End portions of a coupling rod 18 are pivotably coupled with the other end side of the DR-side driving lever 17a and the other end side of the AS-side driving lever 17b through ball joints (not shown) fixed to the other end sides of the driving levers 17a and 17b, respectively.

The motor bracket 30 is adapted to support the wiper motor 50 and allow an output shaft 75 of the wiper motor 50 to pass therethrough. A base end side of a link plate 19 bent so as to be formed into a stepped shape is fixed to the output shaft 75 of the wiper motor 50, and a tip side of the link plate 19 extends in a direction substantially perpendicular to an axial direction of the output shaft 75. Thus, the motor bracket 30 is provided between the wiper motor 50 and the link plate 19.

A ball joint (joint member) 20 is fixed to the tip side of the link plate 19, and one end side of a driving rod 21 is pivotably coupled with the ball joint 20. The other end side of the driving rod 21 is pivotably coupled with the other end side of the AS-side driving lever 17b through a ball joint (not shown).

Here, the link plate 19, the driving rod 21, the AS-side driving lever 17b, the coupling rod 18, and the DR-side driving lever 17a constitute a link mechanism 22. The link mechanism 22 is adapted so that a rotational movement of the link plate 19 depending on a rotational drive of the wiper motor 50 is converted into a swinging movement and is transmitted to the respective pivot shafts 15a and 15b. Accordingly, the rotational drive of the wiper motor 50 allows the wiper blades 12a and 13a to make reciprocating wiping movements within the wiping ranges 11a and 11b on the front glass 11, respectively.

As shown in FIG. 4, the motor bracket 30 includes a holder cylinder portion 31 for pivotably supporting the DR-side pivot shaft 15a through a bearing (not shown) provided inside the motor bracket. A bracket body 32 is provided integrally with the holder cylinder portion 31, and has a planar portion (one side surface) 32a, on which the wiper motor 50 is mounted, and an outer periphery wall portion 32b erectly provided in a vertical direction on an outer periphery side of the planar portion 32a.

As shown in FIG. 3, at a substantially central portion of the planar portion 32a, there is formed a through-hole 32c through which the output shaft 75 of the wiper motor 50 passes from the planar portion 32a side to a back surface side (the other side surface). Around the through-hole 32c, three screw holes 32d through which fixing screws 23 (see FIG. 3) for fixing the wiper motor 50 to the planar portion 32a pass are provided at substantially regular intervals. Moreover, a narrow portion 32e is provided in the narrowest region between an inner surface of the through-hole 32c and the outer periphery wall portion 32b.

A frame attachment portion 33 having a substantially arc-shaped cross-section is provided integrally with the bracket body 32, and a DR-side end portion of the frame member 40 is adapted to be fixed to the frame attachment portion 33 by a pair of screw members 24 (see FIGS. 2 and 3).

The motor bracket 30 has a pair of attaching legs 34, each of which plays a role in fixing the motor bracket 30 to a DR-side vehicle body panel (not shown) of the vehicle 10. As shown in FIG. 2, a bushing 25 made of rubber is mounted to each of the attaching legs 34. The motor bracket 30 is fixed to the DR-side vehicle body panel by inserting a fastening bolt (not shown) into each bushing 25 and fixing the fastening bolt to the DR-side vehicle body panel.

As shown in FIG. 2, the pivot holder 16 includes a holder cylinder portion 16a for pivotably supporting the AS-side pivot shaft 15b through a bearing (not shown) provided inside the pivot holder. The holder cylinder portion 16a is provided with a pair of attaching legs 16b for fixing the pivot holder 16 to an AS-side vehicle body panel (not shown) of the vehicle 10. The bushing 25 similar to that on the DR-side is mounted to each of the attaching legs 16b. The pivot holder 16 is fixed to the AS-side vehicle body panel by inserting a fastening bolt (not shown) into each bushing 25 and fixing the fastening bolt to the AS-side vehicle body panel.

The pivot holder 16 is further provided integrally with a coupling boss 16c, which an AS-side (right side in Figure) end portion of the frame member 40 is fitted in and fixed to.

The frame member 40, which is formed of a hollow cylindrical pipe extending in a vehicle-width direction of the vehicle 10, is provided between the motor bracket 30 and the pivot holder 16, and the frame member 40 couples the motor bracket 30 and the pivot holder 16 so as to be mutually arranged at respective predetermined relative positions. Accordingly, by preparing the frame members 40 different in length, it is possible to be applied to various vehicles having dimensions different in the vehicle-width direction. However, the frame member 40 is not limited to such a hollow cylindrical pipe, and hollow members having other shapes, such as a hollow member having a hexagonal cross-section, may be used in consideration of rigidity and the like required for the frame member 40. As shown in FIG. 5, the wiper motor 50 is constituted by a motor body 60 and a gear case 70, wherein the motor body 60 and the gear case 70 are connected with each other by fastening screws 51.

The motor body 60 includes a yoke 61, which is formed into a bottomed shape by pressing (drawing) a thin steel plate, and a pair of magnets 62 each having a substantially arc-shaped cross-section are fixed inside the yoke 61. An armature 63, around which a coil (not shown) is wound, is rotatably provided so as to be surrounded by the magnets 62, and an armature shaft 64 is fixed at a center of rotation of the armature 63. Thus, the armature shaft 64 becomes rotatable inside the yoke 61.

A commutator 66, which comes in sliding contact with a pair of brushes 65, is fixed to the armature shaft 64, and an end portion of the coil winding the armature 63 is electrically connected to the commutator 66. Since a drive current is supplied from a controller (not shown) to the brushes 65 to flow in the coil, the armature 63 is rotated. As shown in FIG. 6, in addition to the commutator 66, a pair of worms 67 are provided on the armature shaft 64, and disposed inside the gear case 70, respectively.

The gear case 70 is constituted by a case body 71 and a cover 72. The case body 71 is formed into a bottomed shape by casting an aluminum material or the like, and is provided with three attaching legs 71a (only two in Figure), into each of which the fixing screw 23 is screwed.

A pair of counter gears 73 and one worm wheel 74 are rotatably housed inside the case body 71, the worms 67 are caused to mesh with the counter gears 73, respectively, and the respective counter gears 73 are caused to mesh with the worm wheel 74. Thus, rotation of the armature shaft 64 is transmitted to the worm wheel 74 through the worms 67 and the counter gears 73. Moreover, a base end side of the output shaft 75 is fixed at a center of rotation of the worm wheel 74, and a tip side of the output shaft 75 extends outside the case body 71.

Here, the respective worms 67, the respective counter gears 73, and the worm wheel 74 constitute a speed-reduction mechanism in the present invention. The speed-reduction mechanism is adapted to reduce the rotation of the armature shaft 64 by predetermined speed for obtaining high torque, and to output a turning force of the high torque to the outside through the output shaft 75.

An electrically conductive member 76 formed of a thin iron plate as an electrically conductive material is fixed on the worm wheel 74 side (upper side in Figure) opposite to the output shaft 75 side, and is adapted to rotate with the worm wheel 74, that is, with the output shaft 75. The electrically conductive member 76 is provided integrally with a pair of contact pieces (contact points) 77 (only one in Figure), each of which is adapted to come into sliding contact with a contact plate 79 opposed thereto.

The cover 72 is formed into a bottomed shape by injection-molding a resin material such as plastic, and a resin-made substrate 78 equipped with a plurality of electronic components is mounted inside the cover 72. A pair of contact plates 79 formed of thin iron plates as electrically conductive materials are mounted on the substrate 78. The contact pieces 77 are adapted to come into sliding contact with the contact plates 79, respectively, and to detect rotational states of the respective contact pieces 77. Here, the substrate 78 is fixed to the cover 72, and constitutes a non-rotating portion in the present invention.

A controller (not shown) is electrically connected to each of the contact plates 79, and is adapted to determine whether or not the contact plates 79 have been short-circuited with each other by the electrically conductive member 76 through the contact pieces 77. Since the above short-circuit is detected by the controller through the electrically conductive member 76 and the contact plates 79, it is possible to detect the rotational position of the output shaft 75 with respect to the gear case 70, that is, positions of the wiper blades 12a and 13a with respect to the front glass 11 shown in FIG. 1. Here, the electrically conductive member 76 constitutes a first detecting member in the present invention, and each of the contact plates 79 constitutes a second detecting member in the present invention.

In this manner, the wiper motor 50 includes a rotational-position detecting member comprising the electrically conductive member 76 and the contact plates 79, whereby the respective positions of the wiper blades 12a and 13a with respect to the front glass 11 are detected. Therefore, the base end side of the link plate 19 needs to be fixed, with high accuracy, to the tip side of the output shaft 75 at a prescribed position with respect to a rotational direction of the output shaft 75. In this embodiment, the link plate 19 is fixed, with high accuracy, at the above prescribed position of the output shaft 75 using a dedicated assembly jig or the like at a manufacturing stage of the wiper motor 50. The prescribed position in the present invention is set at the lower reversing position.

As shown in FIG. 5, a diameter dimension "d" of the through-hole 32c of the motor bracket 30 is set to have such allowance as to be larger than each of a width dimension "W" of the tip side of the link plate 19 and a height dimension "H" including the ball joint 20 (d>W>H). Accordingly, the tip side of the link plate 19 can be inserted into the through-hole 32c in a state where the link plate 19 is inclined with respect to the motor bracket 30 at a predetermined angle.

Next, a manufacturing method of the wiper apparatus 14 constituted as described above will be described in detail with reference to the drawings.

Figure 7:
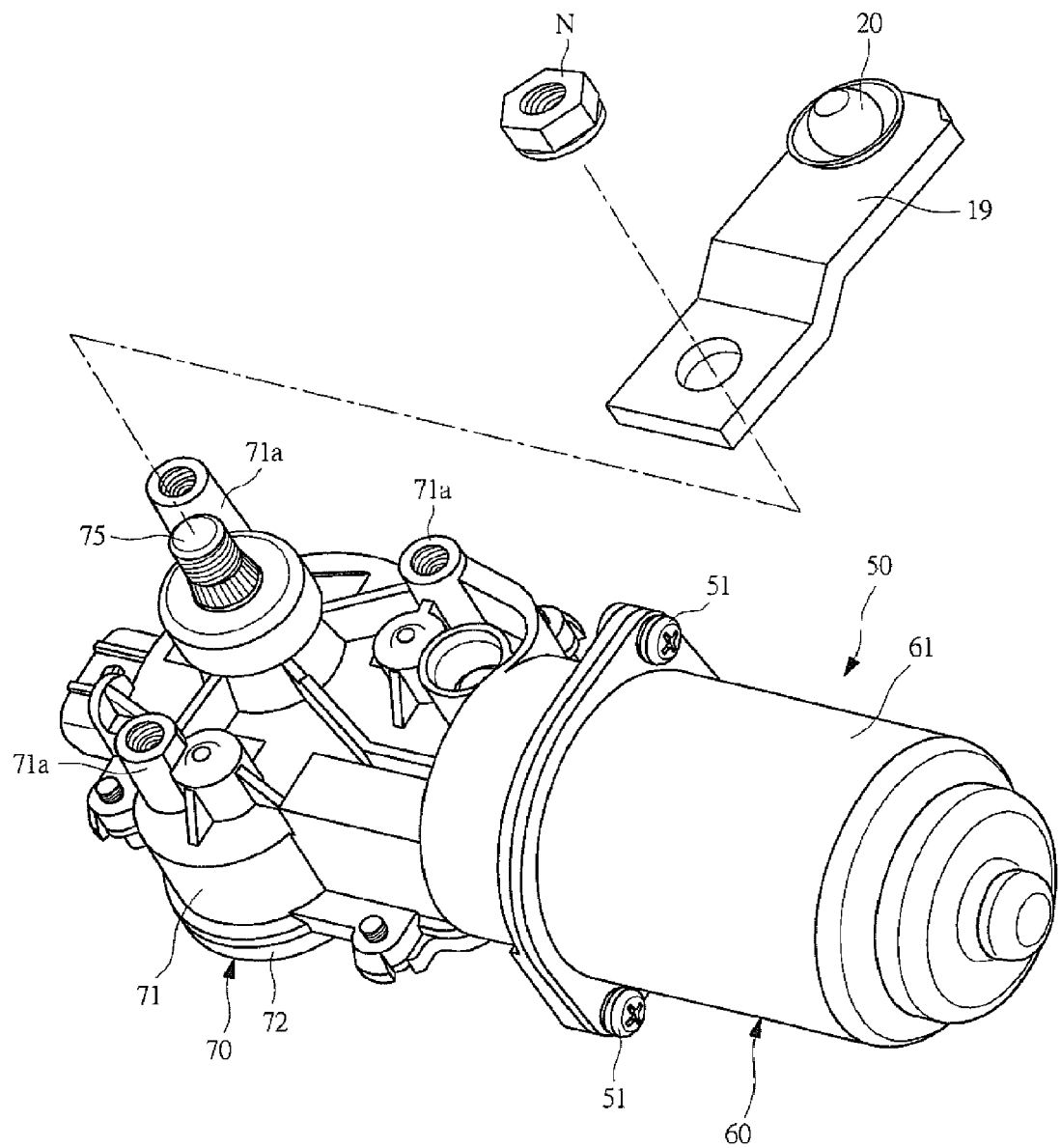
FIG. 7 is an explanatory diagram describing a manufacturing step of the wiper motor.
Figure 8:
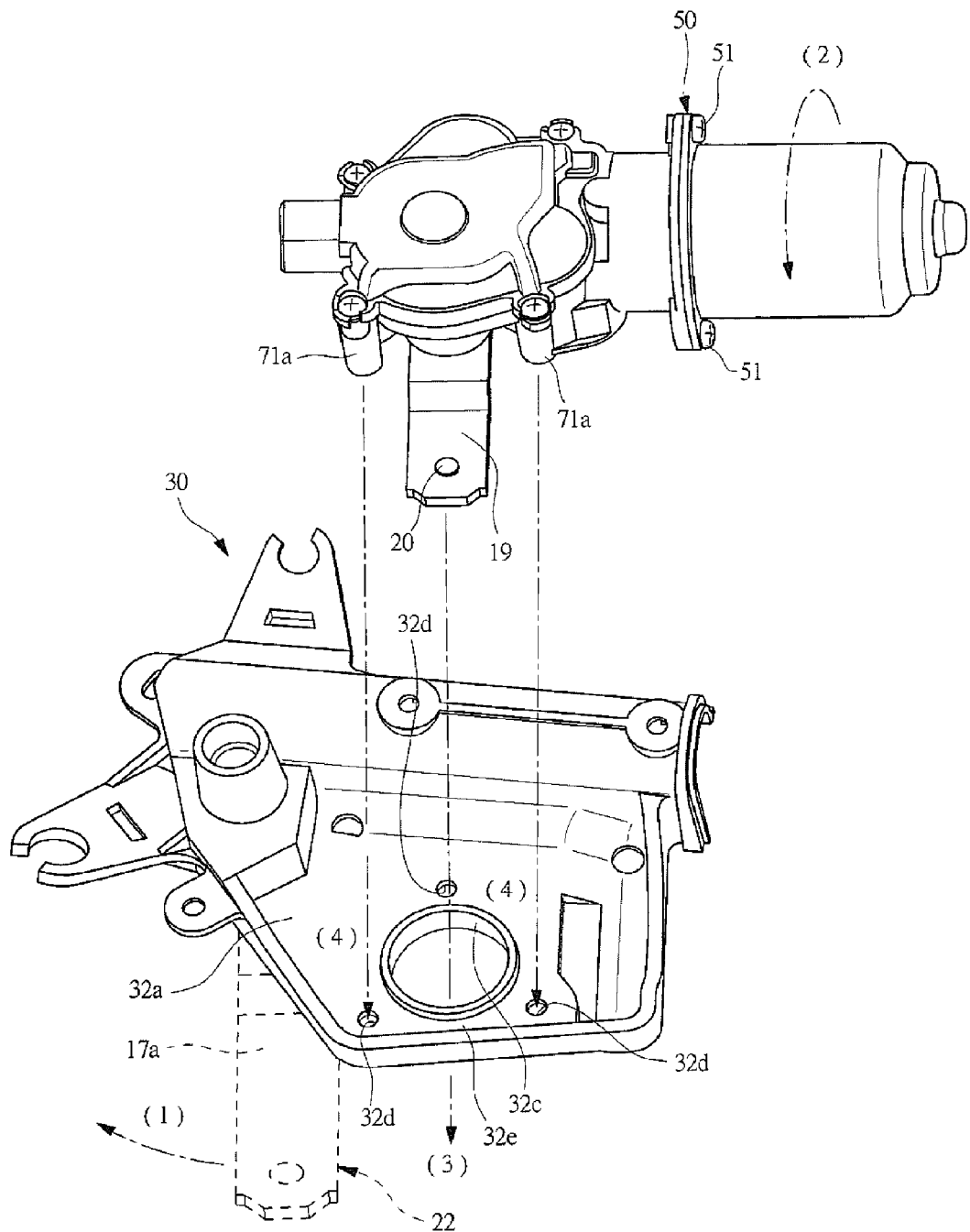
FIG. 8 is an explanatory diagram describing a wiper-apparatus assembling step (first stage)
Figure 9:
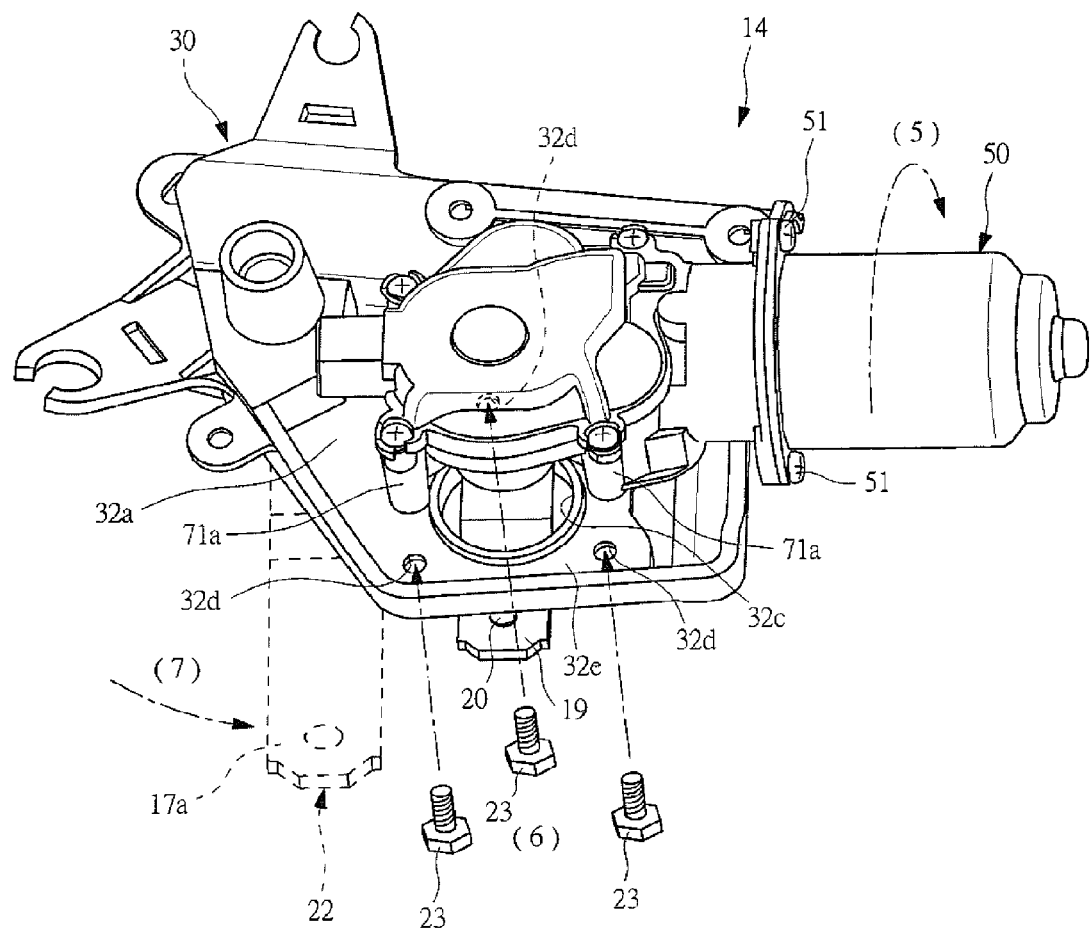
FIG. 9 is an explanatory diagram describing the wiper-apparatus assembling step (second and third stages)
Figure 10A:
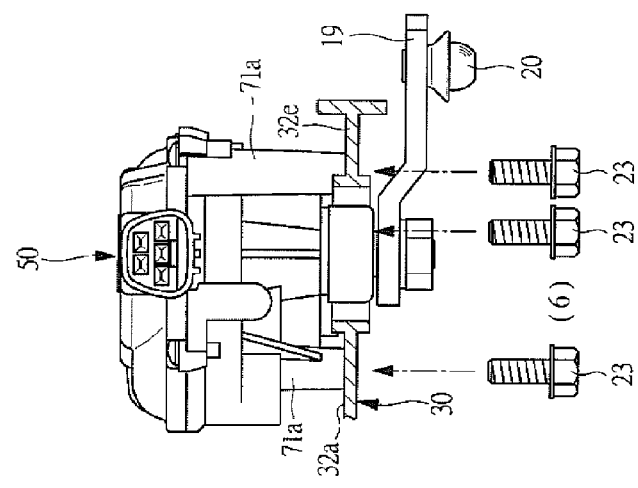
FIG. 10A is an explanatory diagram in which assembling steps of FIGS. 8 and 9 are viewed from a gear case side.
Figure 10B:
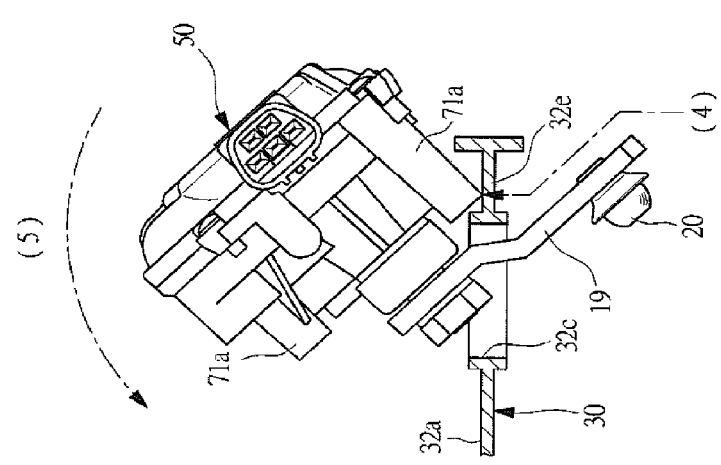
FIG. 10B is an explanatory diagram in which the assembling steps of FIGS. 8 and 9 are viewed from the gear case side.
Figure 10C:
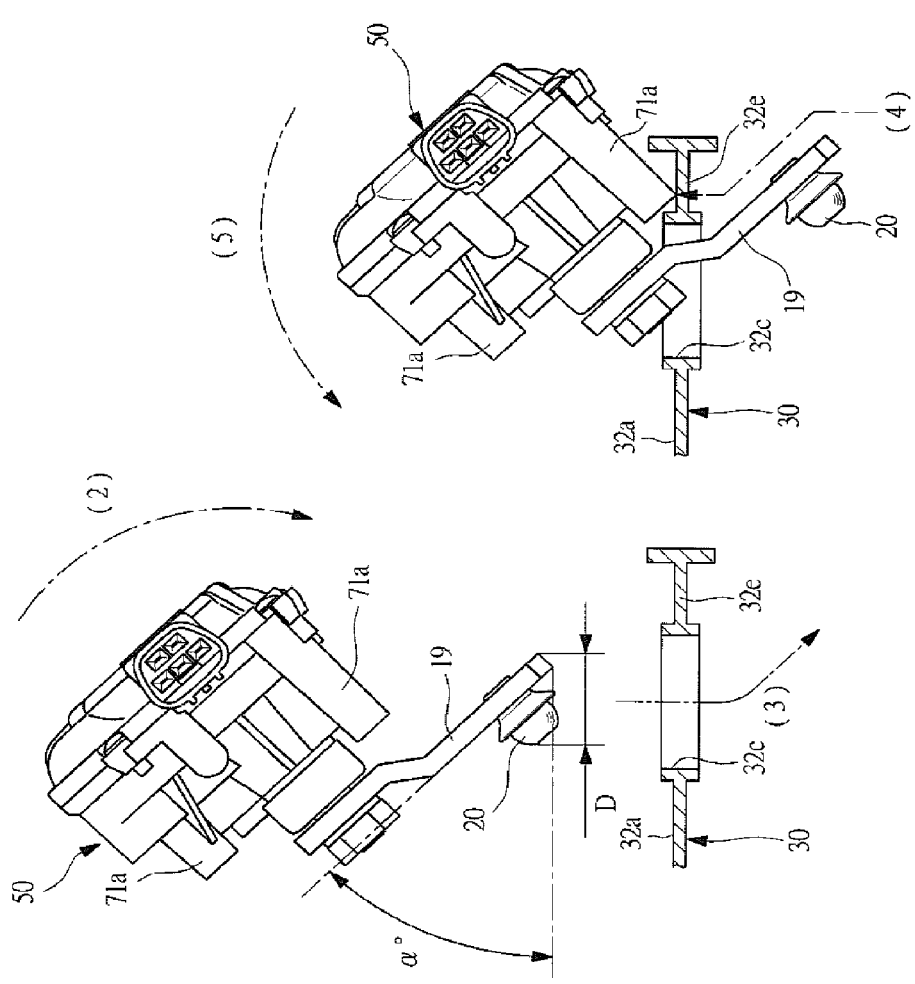
FIG. 10C is an explanatory diagram in which the assembling steps of FIGS. 8 and 9 are viewed from the gear case side.

FIG. 7 is an explanatory diagram describing a manufacturing step of a wiper motor; FIG. 8 is an explanatory diagram describing a wiper-apparatus assembling step (first stage); FIG. 9 is an explanatory diagram describing a wiper-apparatus assembling step (second and third stages); and FIGS. 10A, 10B, and 10C are explanatory diagrams, in each of which the assembling steps of FIGS. 8 and 9 are viewed from a gear case side.

[Manufacturing Step of Wiper Motor]

First, the link plate 19 having the ball joint 20 is prepared by fixing the ball joint 20 to the tip side of the link plate 19. Then, as indicated by a dash-single-dot line in FIG. 7, the base end side of the link plate 19 is fixed by a nut N to the tip side of the output shaft 75 of the wiper motor 50 at a prescribed position with respect to a rotational direction of the output shaft 75. Here, positioning of the link plate 19 with respect to the output shaft 75 is carried out using a dedicated assembly jig or the like with high accuracy. Thereafter, the tip side of the link plate 19 is directed in a direction (vertical direction in Figure) substantially perpendicular to an axial direction (lateral direction in Figure) of the armature shaft 64. As a result, the wiper motor 50 is completed, and preparations for the subsequent wiper-apparatus assembling step are made (first step).

Here, the tip side of the link plate 19 is directed in a direction in which the link plate 19 crosses (or strides) the narrow portion 32e in a state of mounting the wiper motor 50 to the motor bracket 30.

[Wiper-Apparatus Assembling Step (First Stage)]

As shown in FIGS. 8 and 10A to 10C, first, the motor bracket 30 formed into a predetermined shape is prepared. Here, in the case where the link mechanism 22 is previously assembled to the motor bracket 30, as indicated by arrow (1) in Figures, the DR-side driving lever 17a (broken line in Figures) is pivoted by a predetermined angle, whereby the DR-side driving lever 17a is prevented from overlapping with the through-hole 32c.

Then, the wiper motor 50 is rotated, as indicated by arrow (2) in Figures, with respect to the motor bracket 30, and the link plate 19 is inclined so as to have a predetermined angle of a degrees with respect to the motor bracket 30. Then, the tip side of the link plate 19 is faced to the narrow portion 32e of the planar portion 32a. Thereafter, as indicated by arrow (3) in Figures, the wiper motor 50 comes close to the motor bracket 30 in a state in which the link plate 19 is inclined with respect to the through-hole 32c. Here, a width dimension "D" of the tip side of the link plate 19 inclined is smaller than the diameter dimension d of the through-hole 32c (D<d).

The tip side of the link plate 19 including the ball joint 20 is inserted into the through-hole 32c by continuously making the wiper motor 50 close to the motor bracket 30. Then, as indicated by arrow (4) in Figures, a pair of attaching legs 71a located at a lower side in Figures are caused to abut on the planar portion 32a of the motor bracket 30 in a state where the wiper motor 50 is inclined with respect to the motor bracket 30. As a result, a first stage of the wiper-apparatus assembling step is completed (second step).

Incidentally, even when a wiper motor 50 made by another specification in which a width dimension (lateral dimension in FIGS. 10A to 10C) of the gear case 70 is larger than that of this embodiment is mounted onto the motor bracket 30, since the link plate 19 is made to cross the narrow portion 32e of the motor bracket 30 in its mounting process, the mounting can be carried out without interfering of the gear case 70 with the motor bracket 30.

[Wiper-Apparatus Assembling Step (Second Stage)]

As shown in FIGS. 9 and 10A to 10C, according to arrow (5) in Figures, the wiper motor 50 is rotated with respect to the motor bracket 30, and inclination of the link plate 19 with respect to the motor bracket 30 is returned to a horizontal position (level). Then, as indicated by arrow (6) in Figures, the fixing screws 23 are inserted into the screw holes 32d, respectively, and screwed into the attaching legs 71a with predetermined fastening torque, respectively. As a result, the mounting of the wiper motor 50 onto the motor bracket 30 is completed (third step).

[Wiper-Apparatus Assembling Step (Third Stage)]

Thereafter, if the link mechanism 22 has been previously assembled to the motor bracket 30, as indicated by arrow (7) in FIG. 9, the DR-side driving lever 17a is pivoted to return to its original position (level). Then, the link mechanism 22 is coupled, that is, the link plate 19, the driving rod 21, the AS-side driving lever 17b, the coupling rod 18, and the DR-side driving lever 17a which are shown in FIGS. 2 and 3 are pivotably coupled, respectively, whereby the wiper apparatus 14 is completed.

Here, as a result of long-term use of the wiper motor 50, when maintenance such as replacement of the wiper motor 50 is required, the old wiper motor 50 to which the link plate 19 is fixed is removed by procedures reverse to those described above and in a state of fixing the wiper apparatus 14 to the vehicle 10.

Moreover, when the new wiper motor 50 in place of the old wiper motor 50 is mounted onto the motor bracket 30, the new wiper motor 50 having a link plate 19 that is fixed to the output shaft 75 with high accuracy, that is, the wiper motor 50 which has been assembled in the above-mentioned "Manufacturing Step of Wiper Motor", is mounted onto the motor bracket 30 according to the above procedures.

Incidentally, in order to improve maintainability of the wiper motor 50, an inclination angle of the link plate 19 with respect to the through-hole 32c may be optionally adjusted depending on a space of the vehicle 10 side, and a twist angle may be added to the inclination angle of the link plate 19 with respect to the motor bracket 30 according to circumstances.

As detailed above, in the wiper apparatus 14 according to this embodiment, the diameter dimension of the through-hole 32c of the motor bracket 30 is set to a diameter dimension, through which the tip side of the link plate 19 having the ball joint 20 can pass in a state of inclining the link plate 19 with respect to the motor bracket 30, so that replacement work of the wiper motor 50 can be carried out in a state of fixing the link plate 19 to the output shaft 75.

Accordingly, alignment work of the link plate 19 with respect to the output shaft 75 becomes unnecessary at a time of the replacement work of the wiper motor 50, and maintainability can be significantly improved without decreasing positional accuracy of the wiper members 12 and 13 with respect to the front glass 11. Moreover, since the replacement work of the wiper motor 50 can be carried out while the link plate 19 is inclined, a decrease in efficiency of the replacement work can be suppressed even if a space around the wiper motor 50 is small.

Further, in the manufacturing method of the wiper apparatus 14 according to this embodiment, the wiper apparatus 14 can be manufactured by the steps of: preparing the wiper motor 50 having the link plate 19 (first step); inclining the link plate 19 with respect to the through-hole 32c of the motor bracket 30 to insert the tip side of the link plate into the through-hole 32c (second step); and fixing the wiper motor 50 to the motor bracket 30 (third step).

Accordingly, work steps, such as removal of the link plate 19 from the output shaft 75 and fixture of the link plate 19 to the output shaft 75, can be omitted at the time of the replacement work of the wiper motor 50, and maintainability can be significantly improved.

The present invention is not limited to the above embodiments and, needless to say, may be variously modified within a scope of not departing from the gist thereof. For example, in the above embodiments, the case where the ball joint 20 is previously fixed to the link plate 19 has been illustrated in the manufacturing step of the wiper motor 50 (first step), but the present invention is not limited thereto. The ball joint 20 may be fixed to the link plate 19 after the wiper motor 50 has been mounted onto the motor bracket 30, that is, during assembly of the link mechanism 22. In this case, the diameter dimension of the through-hole 32c can be reduced, whereby the rigidity of the motor bracket 30 can be enhanced.

Moreover, in the above embodiments, there has been illustrated the case where the electrically conductive member 76 serving as a first detecting member constituting a rotational-position detecting member is adopted, and where each of the contact plates 79 serving as a second detecting member constituting the rotational-position detecting member is adopted. However, the present invention is not limited thereto. A multiple magnet may be adopted as the first detecting member, and a magnetic sensor such as a hall IC or MR sensor may be adopted as the second detecting member. In this case, since the sliding contact between the first detecting member and the second detecting member can be eliminated, reduction of operation sound of the wiper motor 50, and the like, can be achieved.

Further, in the above embodiments, the case where the wiping pattern of the wiper apparatus 14 is used as a tandem type has been illustrated, but the present invention is not limited thereto, and another wiping pattern such as that used as an opposed wiping type may be employed.

Moreover, in the above embodiments, the apparatus for wiping the front glass 11 on the front side of the vehicle 10 has been illustrated as a wiper apparatus, but the present invention is not limited thereto, and can be also applied to a wiper apparatus for wiping a windshield provided on a rear side of the vehicle 10 or a windshield of a railroad vehicle, aircraft, or the like.

What is claimed is:

1. A wiper apparatus having a wiper motor which swings and drives a wiper member provided on a windshield, and wiping deposits on the windshield, the wiper apparatus comprising:
    a yoke, inside which magnets are fixed so as to be arranged oppositely to each other and which forms the wiper motor;
    an armature shaft rotatably provided between the magnets;
    a gear case connected to the yoke and forming the wiper motor;
    a speed-reduction mechanism rotatably provided in the gear case and reducing speed of rotation of the armature shaft;
    an output shaft, whose base end side is fixed to the speed-reduction mechanism and whose tip side extends outside the gear case;
    a rotational-position detecting member provided in the gear case and detecting a rotational position of the output shaft with respect to the gear case;
    a link plate, whose base end side is fixed on the tip side of the output shaft at a prescribed position with respect to a rotational direction of the output shaft; and
    a motor bracket provided between the wiper motor and the link plate, the wiper motor being mounted onto one side surface of the motor bracket, and the motor bracket having a through-hole through which the output shaft passes toward the other side surface of the motor bracket,
    wherein a diameter dimension of the through-hole is set to a diameter dimension of allowing a tip side of the link plate to pass through the through-hole in a state where the link plate is inclined with respect to the motor bracket.

2. The wiper apparatus according to claim 1, wherein the diameter dimension of the through-hole is set to a diameter dimension of allowing the tip side of the link plate to pass through the through-hole in a state where a joint member is fixed to the tip side of the link plate.

3. The wiper apparatus according to claim 1, wherein the rotational-position detecting member comprises:
    a first detecting member provided integrally with the speed-reduction mechanism and rotating with the output shaft; and
    a second detecting member provided to a non-rotating portion in the gear case opposed to the first detecting member, the second detecting member detecting a rotational state of the first detecting member.

4. A manufacturing method of a wiper apparatus having a wiper motor which swings and drives a wiper member provided on a windshield, and wiping deposits on the windshield, the manufacturing method comprising:
    a first step of pre paring a wiper motor including:
        a yoke, inside which magnets are fixed oppositely to each other;
        an armature shaft rotatably provided between the magnets;
        a gear case connected to the yoke;
        a speed-reduction mechanism rotatably provided in the gear case and reducing speed of rotation of the armature shaft;
        an output shaft, whose base end side is fixed to the speed-reduction mechanism and whose tip side extends outside the gear case;
        a rotational-position detecting member provided in the gear case, and detecting a rotational position of the output shaft with respect to the gear case; and
        a link plate, whose base end side is fixed on the tip side of the output shaft at a prescribed position with respect to a rotational direction of the output shaft;
    a second step of preparing a motor bracket having a through-hole through which the output shaft passes, inclining the link plate with respect to the motor bracket, and inserting a tip side of the link plate into the through-hole in an inclined state; and
    a third step of returning, to a horizontal position, the inclination of the link plate with respect to the through-hole, and fixing the wiper motor to the motor bracket by a fixing screw.

5. The manufacturing method of a wiper apparatus according to claim 4, wherein a joint member is previously fixed to the tip side of the link plate in the first step, and the tip side of the link plate, to which the joint member is fixed, is inserted into the through-hole in the second step.

6. The manufacturing method of a wiper apparatus according to claim 4, wherein the rotational-position detecting member comprises:
    a first detecting member provided integrally with the speed-reduction mechanism and rotating with the output shaft; and
    a second detecting member provided to a non-rotating portion in the gear case opposed to the first detecting member, the second detecting member detecting a rotational state of the first detecting member.

* * * * *